July 28, 1925.

H. O. HEM

WEIGHING SCALE

Filed July 30, 1920

Inventor

HALLOR O HEM.

By George R. Frye

Attorney

July 28, 1925.  1,547,322
H. O. HEM
WEIGHING SCALE
Filed July 30, 1920  2 Sheets-Sheet 2
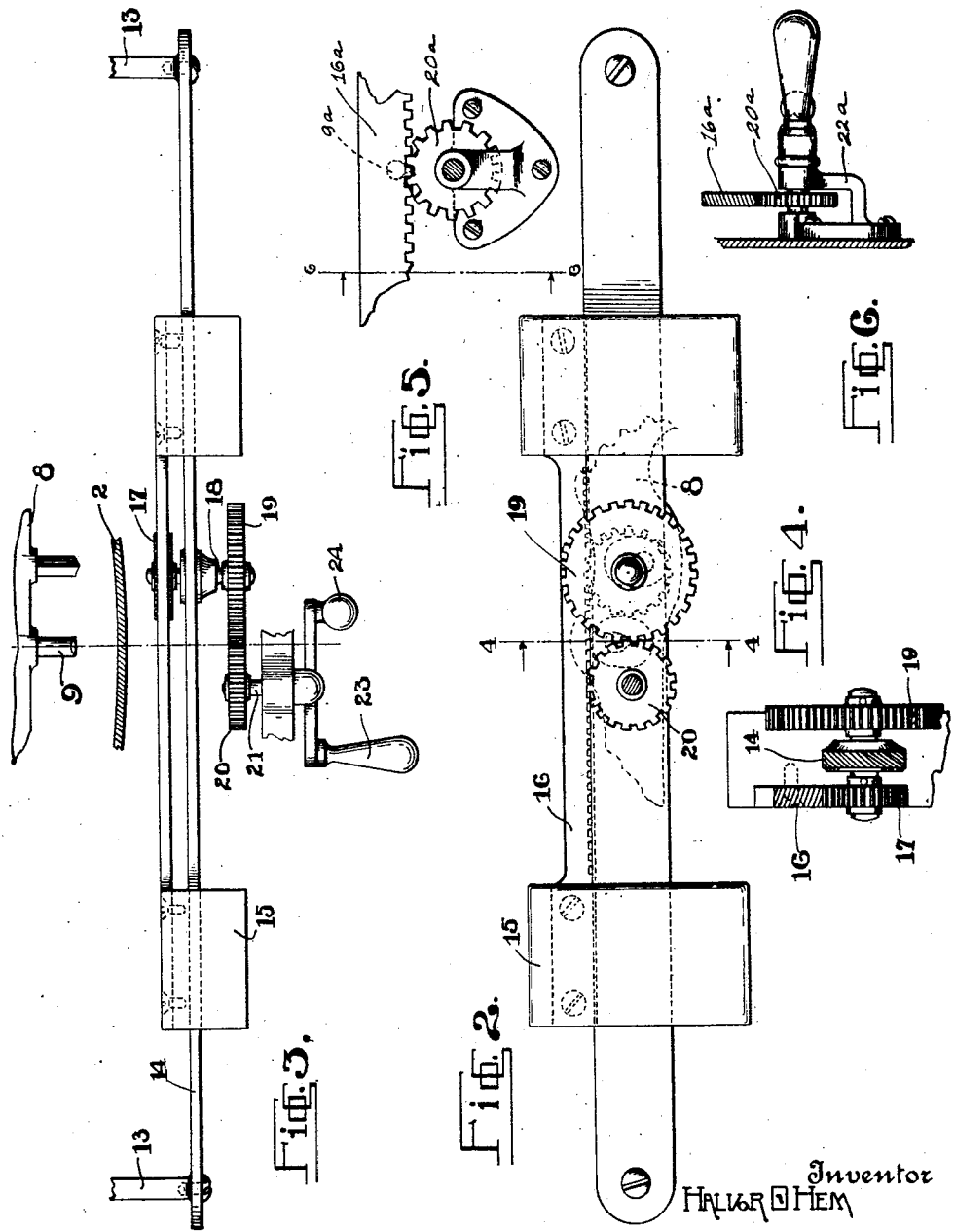
Inventor
HALVOR O HEM
By George R. Frye
Attorney Patented July 28, 1925.

1,547,322

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed July 30, 1920. Serial No. 399,992.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales, particularly to automatic scales in which provision is made for setting the indicator back to zero while there is a load upon the commodity-receiver, so that successive additions to the load may be weighed. Such scales are used for compounding, in dairies for weighing milk as it is received, and for many other purposes. In a scale for weighing milk, for example, the commodity-receiver may be a tank into which the milk is poured from cans as they are received from the producer. When the milk from the first can is poured into the tank its weight is automatically indicated on a dial. The indicator is then set back to zero, the milk in the second can is poured into the tank, and its weight automatically registered, the operation being repeated until the tank is full or the supply exhausted.

My invention has for its principal object the provision of means for re-balancing the scale with the indicator at zero while a previously weighed load remains upon the commodity-receiver.

Another object is the provision of means for conveniently operating the balancing device without noticeably affecting the load-offsetting mechanism.

Still another object is the provision of operating means of this character so arranged as not to introduce appreciable friction into the weighing movements of the scale.

Other objects and advantages will be apparent from the following description, in which reference is had to the accompanying drawings illustrating preferred embodiments of my invention and wherein similar reference numerals designate similar parts throughout the several views.

In the drawings:—

Figure 2 is an enlarged front elevation of the re-balancing mechanism forming a part of this form of my invention, parts being shown in section;

Figure 3 is an enlarged fragmentary plan view showing the re-balancing mechanism;

Figure 4 is a vertical sectional view taken substantially on the line 4—4 of Figure 2;

Figure 5 is a fragmentary elevation showing another form of re-balancing mechanism, the operating shaft being shown in section; and Figure 6 is a side elevation of substantially the parts shown in Figure 5.

Figure 1:
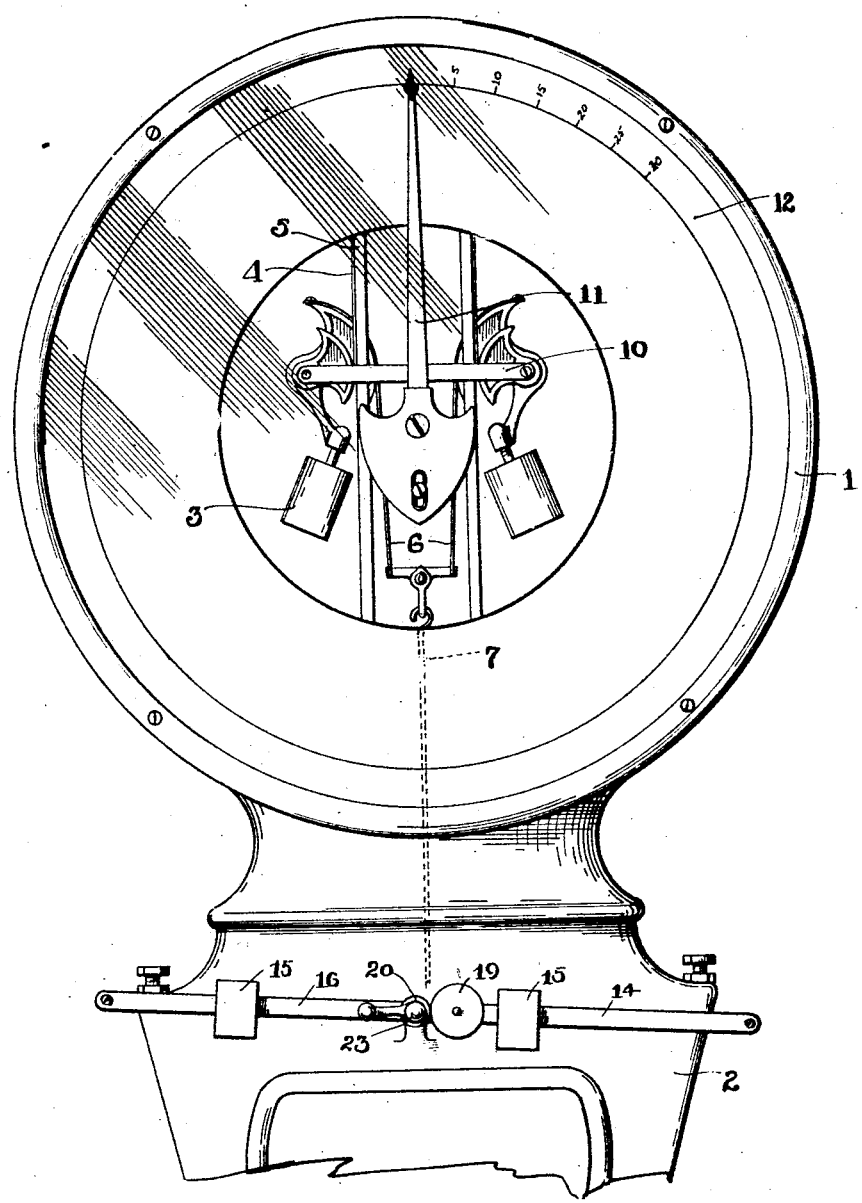
Figure 1 is a front elevation of a portion of a scale embodying one form of my invention.

Automatic weighing mechanism of any preferred type, such as springs or automatic poises, may be used in the scale of my invention, but I prefer to employ double pendulum mechanism of substantially the type shown and described in the patent to Hapgood, No. 1,203,611, dated November 7, 1916. In the illustrated embodiment herein shown, the load-offsetting and indicating mechanism is enclosed in a suitable housing 1 supported upon a hollow standard or column 2.

The mechanism consists of a pair of oppositely-swinging pendulums 3 supported by means of flexible metallic ribbons 4 upon a frame 5 secured within the housing. The pendulums are connected by means of flexible ribbons 6 and a rod 7 to a lever 8, which is in turn connected to the platform lever mechanism (not shown). When a load is placed upon the scale the lever 8 is rocked upon its pivot 9, the rod 7 and ribbons 6 are pulled downwardly, and the pendulums 3 swing outwardly and upwardly until the load is offset. The pendulums are connected to a compensating bar 10 which moves upwardly with the pendulums and is connected by means of a rack and pinion (not shown) to the indicator hand 11, which is thus caused to move over the dial 12 to indicate the weight of the load. Projecting forwardly from each end of the lever 8 is a finger 13, and to these fingers is secured a beam 14 carrying a pair of heavy connected poises 15. The scale is sealed so that when it is under no load and the connected poises are at their extreme left position, the indicator hand stands at zero. After the scale has been placed under load and the indicator has moved to its appropriate position over the chart, the poises may be moved to the right. This will cause the pendulums to descend and the indicator to move backwardly until, when the load is exactly counterbalanced by the poises, the indicator will again stand at zero. The beam may, if desired, be graduated so that the weight may then be read upon the beam. If, when the indicator has thus been returned to zero, an additional load be placed upon the commodity-receiver, the indicator will swing to a point indicative of the weight of the additional load. The poises may then be moved until the indicator again stands at zero and the operation repeated as often as the capacity of the beam 14 permits. By making the poises 15 relatively heavy, the capacity of the beam 14 may be made relatively great. If the beam be graduated, the total of the original and additional loads may be read upon the beam, or the poises may be again moved to their extreme left position, when the total load will be offset by the pendulums and indicated upon the dial.

It would obviously be difficult to move the poises by hand without in the least bearing down upon or lifting the beam. I have, however, provided a poise-shifting device which does not tend to swing the beam either upwardly or downwardly. The member connecting the poises is a rack bar 16 which meshes with a pinion 17 fixed upon a shaft 18 journaled in the beam 14. Fixed upon the forward end of the shaft 18 is a gear 19 which meshes with a gear 20 fixed to a shaft 21 which is journaled in a bracket 22 secured to the column 2, the forward end of the shaft 21 being provided with a handle 23 which is balanced by means of a ball so that the shaft 21 is in neutral equilibrium. When the handle 23 is turned, the shafts 21 and 18 are rotated and the rack which meshes with the pinion 17 is moved endwise, thereby shifting the poises.

In order that the balance of the scale may be unaffected by the pressure of the gear 20 upon the gear 19, these gears are so located that the point where their pitch circles touch lies in an extension of the knife edge or axis of the fulcrum pivot 9. When the gears are so located, pressure of the teeth of the gear 20 on the teeth of the gear 19 is applied substantially on the pivotal axis of the lever. Hence it tends to force neither end of the lever downwardly. The movement of the beam is, of course, very slight, and adjacent its pivotal axis the movement is practically nil, so that there is no appreciable friction due to relative movement of the gears during weighing movements of the beam.

In the form shown in Figures 5 and 6, the pitch line of the rack bar 16ª intersects the pivotal axis of the beam. A pinion 20ª fixed to a shaft 21ª journaled in a bracket 22ª meshes with the rack at its intersection with the axis of the lever. Since the pitch circle of the pinion 20ª and the pitch line of the rack contact at a point in alignment with the knife edge of the pivot 9ª, it is obvious that turning the pinion to shift the rack does not tend to swing the lever about its pivot, and that there is no appreciable friction between the rack and pinion during weighing movements of the beam.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a weighing scale, in combination, a beam, a poise carried thereby, and means for moving said poise, including a gear train partly carried by said beam, said gear train consisting of meshing pinions rotating in the same plane.

2. In a weighing scale, in combination, a frame, a beam pivoted thereon, a poise carried by said beam, and means for moving said poise, including a gear carried by said frame and a gear carried by said beam, said gears rotating in the same plane and meshing substantially in alignment with the pivotal axis of said beam.

3. In a weighing scale, in combination, a frame, automatic weighing mechanism supported thereon, a beam pivoted on said frame and connected to said automatic weighing mechanism, a poise on said beam, means for moving said poise, including a gear carried by said frame and a gear carried by said beam, said gears rotating in the same plane and meshing substantially in alignment with the pivotal axis of said beam.

4. In a weighing scale, in combination, a frame, automatic weighing mechanism supported thereon, a beam pivoted on said frame and connected to said automatic weighing mechanism, a poise on said beam, means for moving said poise including a gear carried by said frame and a gear carried by said beam, said gears rotating in the same plane and meshing substantially in alignment with the pivotal axis of said beam, and a rack connected to said poise and meshing with said beam carried gear.

HALVOR O. HEM.

Witnesses:
C. O. MARSHALL,
C. E. WILCOX.